(12) United States Patent
Hannessen

(10) Patent No.: US 10,000,348 B2
(45) Date of Patent: Jun. 19, 2018

(54) ASSEMBLY COMPRISING A PALLET LIFT AND A PALLETIZING DEVICE

(71) Applicant: QIMAROX PATENTEN B.V., Harderwijk (NL)

(72) Inventor: Pieter Gerrit Hannessen, Harderwijk (NL)

(73) Assignee: QIMAROX PATENTEN B.V. (NL)

( * ) Notice: Subject to any disclaimer, the term of this patent is extended or adjusted under 35 U.S.C. 154(b) by 0 days. days.

(21) Appl. No.: 15/324,340

(22) PCT Filed: Jul. 7, 2015

(86) PCT No.: PCT/NL2015/050496
§ 371 (c)(1),
(2) Date: Jan. 6, 2017

(87) PCT Pub. No.: WO2016/007003
PCT Pub. Date: Jan. 14, 2016

(65) Prior Publication Data
US 2017/0183171 A1    Jun. 29, 2017

(30) Foreign Application Priority Data

Jul. 8, 2014 (NL) ...................... 2013147

(51) Int. Cl.
*B65G 59/02* (2006.01)
*B65G 57/03* (2006.01)
(Continued)

(52) U.S. Cl.
CPC ........... *B65G 57/035* (2013.01); *B65G 1/026* (2013.01); *B65G 1/0407* (2013.01); *B65G 57/00* (2013.01)

(58) Field of Classification Search
CPC .... B65G 57/035; B65G 57/06; B65G 57/245; B65G 61/00; B65G 65/00; B65G 47/46;
(Continued)

(56) References Cited

U.S. PATENT DOCUMENTS 3,157,294 A * 11/1964 Bolt ...................... B65G 57/00
414/790
3,166,203 A *  1/1965 Jeremiah .............. B65G 57/005
414/789.5

(Continued)

FOREIGN PATENT DOCUMENTS

CA      2877946 A1 *  1/2014 .......... B65G 57/035
EP    0 999 156 A1      5/2000
(Continued)

OTHER PUBLICATIONS

The Physics Factbook, "Height of an Adult Human", available as of Oct. 2, 2007 at https://hypertextbook.com/facts/2007/SimasCeckauskas.shtml.*

(Continued)

*Primary Examiner* — Gregory W Adams
(74) *Attorney, Agent, or Firm* — McDonnell Boehnen Hulbert & Berghoff LLP

(57) ABSTRACT

The present invention relates to an assembly including a pallet lift with which a pallet is displaceable in height direction, a palletizing device which is arranged close to the upper side of the pallet lift and with which objects are arrangeable on a pallet supported by the pallet lift, a first support surface arranged at a first distance under the palletizing device such that at least a part of the upper side of the palletizing device is accessible to an operator standing on the first support surface; and a second support surface arranged at a second distance under the first support surface such that at least a part of the underside of the palletizing (Continued)

device is accessible to an operator standing on the second support surface.

15 Claims, 5 Drawing Sheets

(51) Int. Cl.
*B65G 57/00* (2006.01)
*B65G 1/02* (2006.01)
*B65G 1/04* (2006.01)

(58) Field of Classification Search
CPC ........ B65G 47/82; B65G 57/10; B65G 57/22; B65G 59/02; Y10S 414/109; Y10S 414/106
See application file for complete search history.

(56) References Cited

U.S. PATENT DOCUMENTS

| | | | | |
|---|---|---|---|---|
| 3,669,282 A | * | 6/1972 | Carlson | B65G 57/035 198/610 |
| 4,132,321 A | * | 1/1979 | Bowlby | B65G 57/06 414/790.6 |
| 4,271,755 A | | 6/1981 | Kintgen et al. | |
| 4,774,799 A | | 10/1988 | Durant | |
| 5,791,865 A | * | 8/1998 | Bublitz | B65G 57/245 414/730 |
| 8,468,781 B2 | * | 6/2013 | Fritzsche | B65B 35/52 414/791.6 |
| 8,801,358 B2 | * | 8/2014 | Kussner | B65G 65/00 414/789.6 |
| 9,481,530 B2 | * | 11/2016 | Brandmuller | B65G 59/026 |
| 9,776,812 B2 | * | 10/2017 | Cavelius | B65G 57/10 |
| 2003/0206789 A1 | * | 11/2003 | Tai | B65G 1/02 414/275 |
| 2009/0136328 A1 | * | 5/2009 | Schafer | B65G 1/1378 414/273 |
| 2013/0008744 A1 | * | 1/2013 | Ernst | B41F 7/12 182/113 |

FOREIGN PATENT DOCUMENTS

| | | | |
|---|---|---|---|
| EP | 1 211 198 A1 | 6/2002 | |
| EP | 0 999 156 B1 | 10/2004 | |
| EP | 1 855 969 B1 | 4/2012 | |
| WO | WO-2013092915 A1 * | 6/2013 | ........... B65G 59/026 |

OTHER PUBLICATIONS

PCT International Search Report and Written Opinion, PCT International Application No. PCT/NL2015/050496, dated Nov. 3, 2015, 8 pages.
Press Release "Qimarox introduces the Highrunner mk7 Fast, flexible and cost-effective standard palletiser" Jul. 2013, pp. 1-2.
Brochure Qimarox Highrunner Mk7 (2013), pp. 1-4.

* cited by examiner

ASSEMBLY COMPRISING A PALLET LIFT AND A PALLETIZING DEVICE

CROSS REFERENCE TO RELATED APPLICATIONS

The present application is a national stage entry of PCT/NL2015/050496, filed 7 Jul. 2015, and claims priority to NL 2013147 filed 8 Jul. 2014. The full disclosures of NL 2013147 and PCT/NL2015/050496 are incorporated herein by reference.

The invention relates to an assembly, comprising:
a pallet lift with which a pallet is displaceable in height direction;
a palletizing device which is arranged close to the upper side of the pallet lift and with which objects are arrangeable on a pallet supported by the pallet lift; and
a first support surface arranged at a first distance under the palletizing device such that at least a part of the upper side of the palletizing device is accessible to an operator standing on the first support surface.

This configuration is frequently applied and has the significant shortcoming that the underside of the palletizing device is poorly accessible for the purpose of arranging an insert sheet on a layer, repairing breakdowns or performing maintenance operations.

The invention now has for its object to provide an assembly of the above described type wherein said drawbacks do not occur, or at least do so to lesser extent.

Said object is achieved with the assembly according to the invention, comprising:
a pallet lift with which a pallet is displaceable in height direction;
a palletizing device which is arranged close to the upper side of the pallet lift and with which objects are arrangeable on a pallet supported by the pallet lift;
a first support surface arranged at a first distance under the palletizing device such that at least a part of the upper side of the palletizing device is accessible to an operator standing on the first support surface; and
a second support surface arranged at a second distance under the first support surface such that at least a part of the underside of the palletizing device is accessible to an operator standing on the second support surface.

Because the assembly further comprises a second support surface arranged a second distance under the first support surface, an operator located on this second, lower-lying support surface can reach at least the part of the underside of the palletizing device in comfortable manner. An operator can for instance thus place an insert sheet on a layer of objects arranged by the palletizing device on a pallet and/or correct the placing thereof before a subsequent layer of objects is set down thereon.

The first support surface is arranged close to the upper side of the pallet lift and the palletizing device is accessible by an operator standing on this first support surface.

It is noted that the first support surface and/or the second support surface can be part of a building. The first and/or second support surface is alternatively supported on the assembly of the pallet lift and the palletizing device, or on the ground via a frame.

According to a preferred embodiment, the palletizing device comprises a forming surface for forming objects thereon, and wherein the first distance at which the first support surface is arranged under the forming surface is substantially 0.5-1.1 m, more preferably substantially 0.6-1.0 m, and still more preferably substantially 0.7-0.9 m. A first distance of 0.8 m is found to be ideal for allowing an operator with an average body height of an adult person to reach over the palletizing device.

A $95^{th}$ percentile adult male person in Europe has a body height of about 1.85 m and, with an arm extended fully upward, a reach in height direction of about 2.26 m. When reaching in forward direction the arm length is about 0.84 m.

In order to enable an operator with an average body height of an adult person, when he/she is standing on the second support surface, to reach from there at least a part of the underside of the palletizing device, according to a further preferred embodiment the second distance at which the second support surface is arranged under the first support surface is a maximum of 1.5 m, more preferably a maximum of 1.4 m and still more preferably a maximum of 1.3 m.

It is noted that the forming surface of the palletizing device is located in practice close to the underside of the palletizing device, as is for instance the case in the QIMAROX HIGHRUNNER® Mk7 supplied by applicant. At a maximum distance between the two support surfaces of 1.5 m the maximum distance from the lower-lying second support surface to the forming surface of the palletizing device amounts to about 1.5+0.8=2.3 m. This distance corresponds to the reach in height direction of a $95^{th}$ percentile adult European male when he extends his arm in height direction.

According to a further preferred embodiment, the first support surface comprises at least one longitudinal part and at least one transverse part arranged transversely of the longitudinal part, wherein the first support surface is adjacent to at least two sides of the palletizing device and makes this latter accessible to an operator. Because the transverse part and the longitudinal part together make at least two (connected) sides of the palletizing device accessible to the operator, he/she can reach at least the forming surface of the palletizing device without further aids.

According to yet another preferred embodiment, the second support surface comprises at least one longitudinal part and at least one transverse part arranged transversely of the longitudinal part, wherein the second support surface is adjacent to the pallet lift on at least two sides and makes a pallet present on the pallet lift accessible to an operator. The pallet lift and a pallet present thereon are also readily accessible to an operator when he/she has access to at least two (connected) sides of the pallet lift.

It is particularly advantageous when, according to yet another preferred embodiment, the second support surface is provided with one or more further longitudinal parts and at least partially encloses the pallet lift on at least three sides. Not only is a pallet carried by the pallet lift thus readily accessible, the pallet lift itself is also readily accessible for the purpose of repairing breakdowns and (maintenance) operations.

With a limited difference in level of a maximum of 1.5 m between the first and second support surfaces an adult person would have insufficient headroom available to him/her, and could bump against or otherwise be injured by the upper first support surface when this person is located on the underlying second support surface. This is effectively prevented when, according to yet another preferred embodiment, the transverse parts of the first support surface and the second support surface are arranged offset relative to each other, and wherein the first support surface is provided with a recess 36 above the transverse part 44 of the second support surface. Also prevented in this way is that a person would have to move along the first support surface while bending or even crawling.

The palletizing device is provided via a feed conveyor with objects to be formed and arranged on a pallet. In order to make this feed conveyor readily accessible for the purpose of repairing possible breakdowns, the first support surface is preferably situated at least on the side of the palletizing device where the objects are supplied via a feed conveyor. According to yet another preferred embodiment, at least a longitudinal part of the first support surface is thus provided on the feed side of the palletizing device where the objects are supplied to the palletizing device.

In order to increase safety, according to yet another preferred embodiment one or more stairways and/or ladders are provided between the first support surface and the second support surface. These stairways and/or ladders allow an operator to move to another part of the one support surface via the other support surface. An operator located on the first support surface on a first side of the feed conveyor of the palletizing device can thus move via a stairway or ladder to the lower second support surface. The operator can move safely round the lift on this lower second support surface and move back onto the first support surface on the other side via a stairway or ladder. An operator can thus move from a first side of the feed conveyor to a second side thereof without the operator him/herself having to step over this conveyor or having to crawl underneath it, which would be unsafe. The operator can now walk around it safely via the second support surface.

In a factory setup a plurality of assemblies of a pallet lifts and associated palletizing device will generally be placed adjacently of each other. It is particularly advantageous according to yet another preferred embodiment of the invention that at least one transverse part of the first support surface and/or at least one transverse part of the second support surface comprise a surface area such that two adjacently disposed pallet lifts and/or palletizing devices are accessible therefrom.

Preferred embodiments of the present invention are further elucidated in the following description with reference to the drawing, in which.

Figure 1:
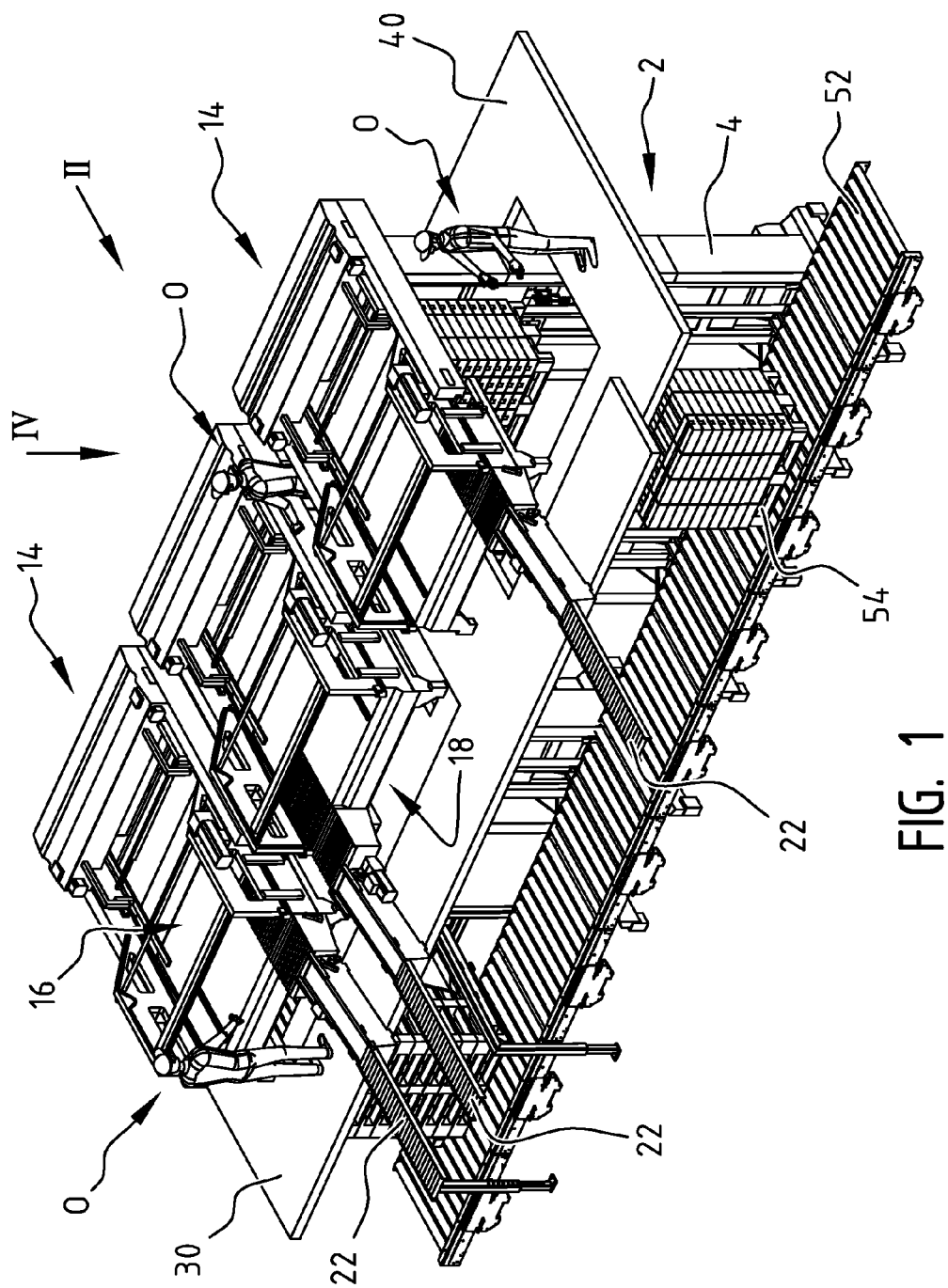
FIG. 1 is a perspective view of a factory setup with three sets of a pallet lift and associated palletizing device, with support surfaces according to the invention.
Figure 2:
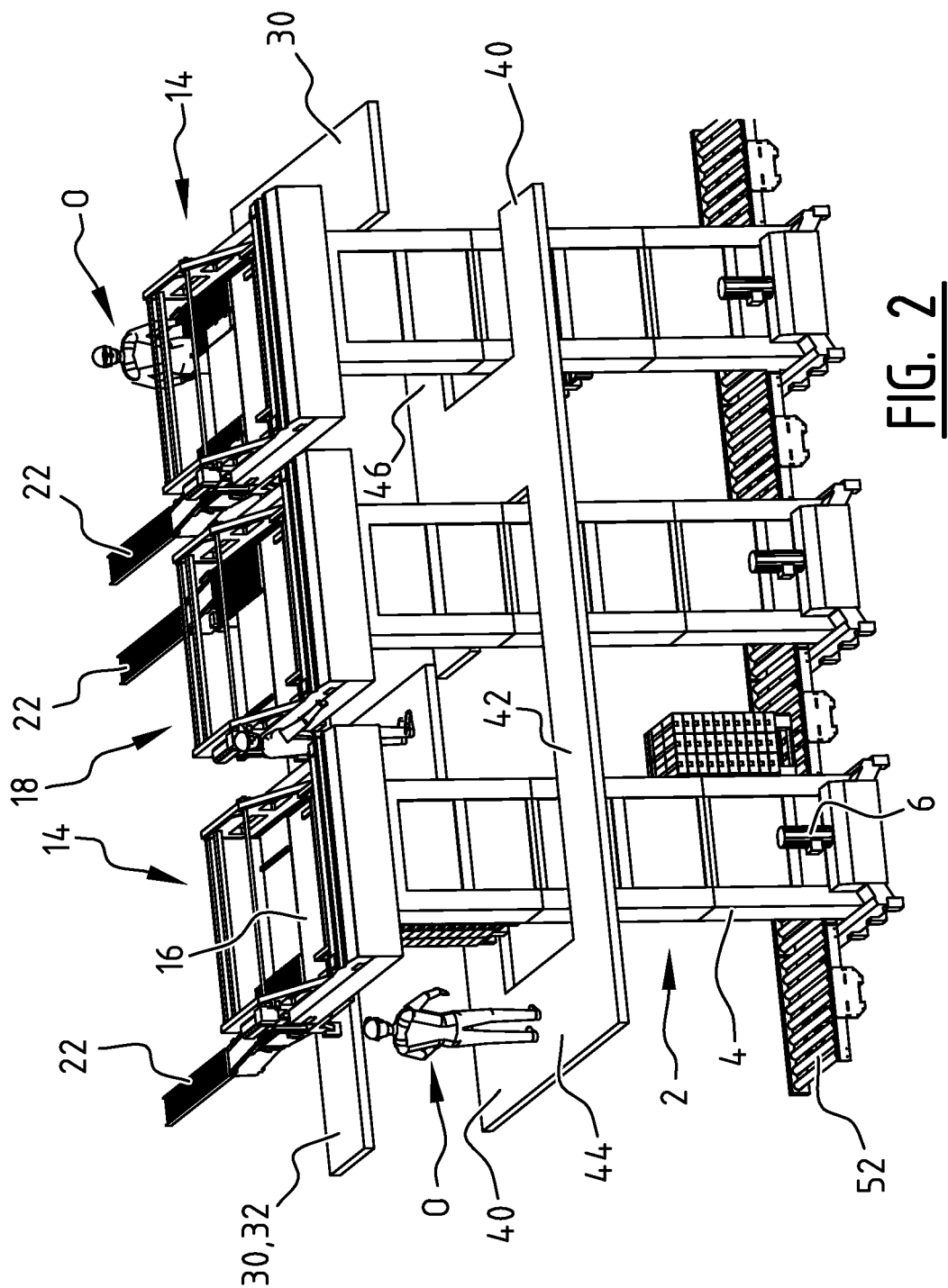
FIG. 2 is a perspective view from the rear of the setup shown in FIG. 1.
Figure 3:
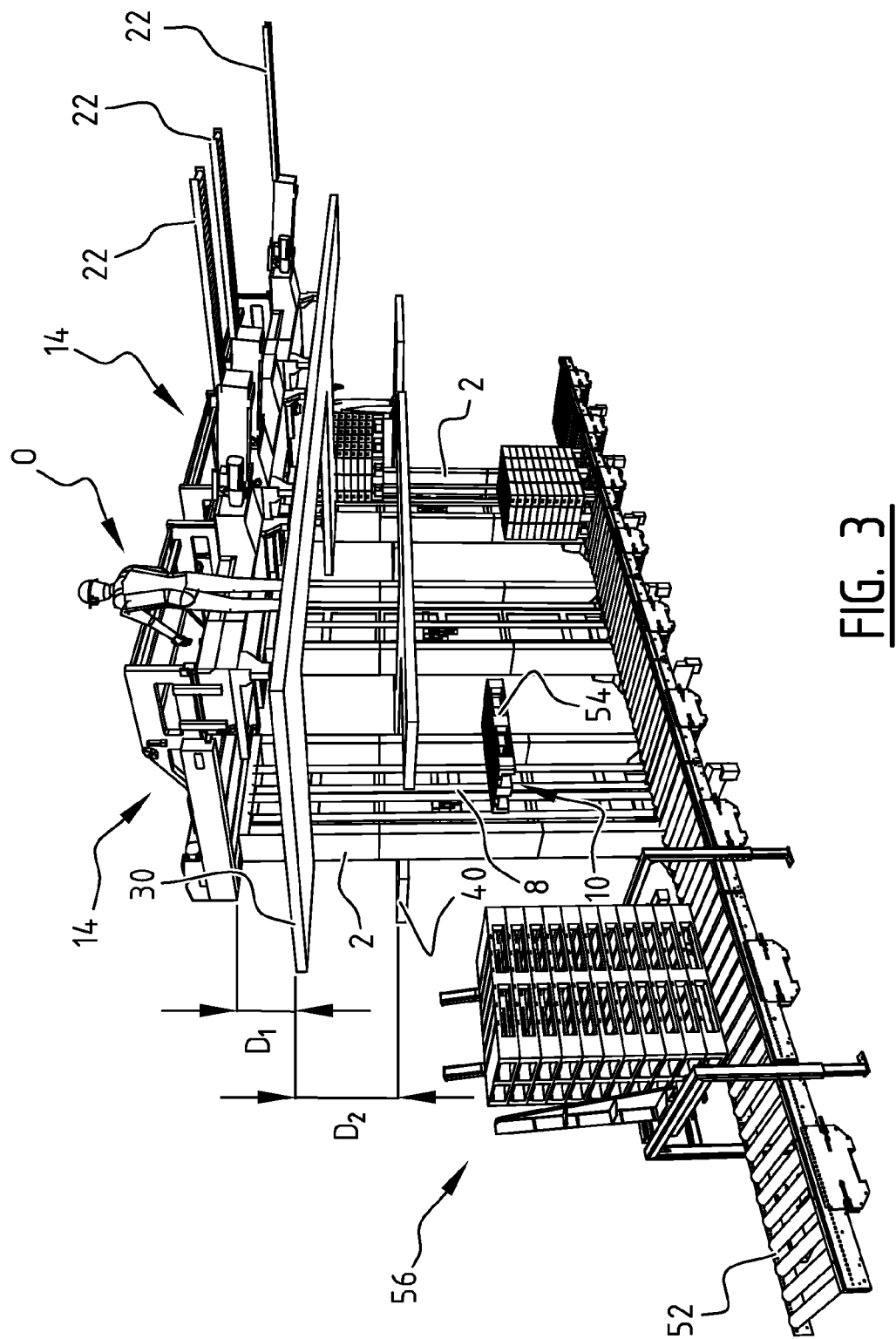
FIG. 3 is a perspective view of the setup shown in FIG. 1 looking obliquely upward from the underside.

The perspective views shown in FIGS. 1-3 show three pallet lifts 2, wherein close to the upper side of pallet lift 2 is arranged a palletizing device 14 with which objects are arrangeable on a pallet 54 supported by pallet lift 2. Pallet lift 2 comprises a frame 4 and a carrier 10 displaceable in a height direction along the frame via a guide 8 using a motor 6. Carrier 10 is configured to displace a pallet 54 in height direction to position close to forming surface 16 of palletizing device 14. Palletizing device 14 is configured to form on forming surface 16 objects supplied via a feed conveyor 22 on a feed side 18 of palletizing device 14 before they are set down onto the pallet 54 held aloft by carrier 10 of pallet lift 2. Once a layer of objects has been set down on pallet 54, pallet lift 2 lowers pallet 54 a layer height, after which palletizing device 14 can set down a subsequent layer of formed objects onto pallet 54.

Arranged close to palletizing device 14 at a first distance $D_1$ thereunder is a first support surface 30. An operator O standing on this first support surface 30 can operate palletizing device 14 and perform operations therefrom, such as repairing breakdowns and carrying out maintenance operations.

Arranged at a second distance $D_2$ under first support surface 30 is a second support surface 40. An operator O present on this second support surface 40 can from here reach the underside of palletizing device 14 and pallet 54 in comfortable manner and perform operations. Possible operations can comprise of placing and/or correcting the orientation of insert sheets, repairing breakdowns and performing maintenance operations.

First support surface 30 is for instance arranged at a distance of 0.8 meter below forming surface 16 which is generally situated close to the underside of palletizing device 14. A first distance $D_1$ of 0.8 meter is found to be ideal to allow an operator O with an average body height of an adult person to reach over palletizing device 14.

In order to enable an operator O with an average body height of an adult person, when he/she is standing on second support surface 40, to reach at least a part of the underside of palletizing device 14 therefrom, the second distance $D_2$ at which second support surface 40 is arranged under first support surface 30 is in the shown embodiment 1.3 meter. Although the combined distance of the first distance $D_1$ and second distance $D_2$ is 0.8+1.3=2.1 meters in the shown embodiment, and is thus sufficiently high that a person with an average body height standing on second support surface 40 will not bang his/her head on the underside of palletizing device 14, the distance between first support surface 30 and second support surface 40 is insufficient for a standing adult person. For this reason the first support surface 30 and second support surface 40 are embodied and oriented relative to each other such that an operator O can take up a standing position on the underlying second support surface 40 without being obstructed here by the upper first support surface 30, as will be further elucidated with reference to FIGS. 4-6.

The setup shown in FIGS. 1-3 further comprises a pallet conveyor 52 with which pallets 54 can be fed to and removed from pallet lifts 2. A pallet buffer 56 is likewise provided for the storage of empty pallets 54.

Figure 4:
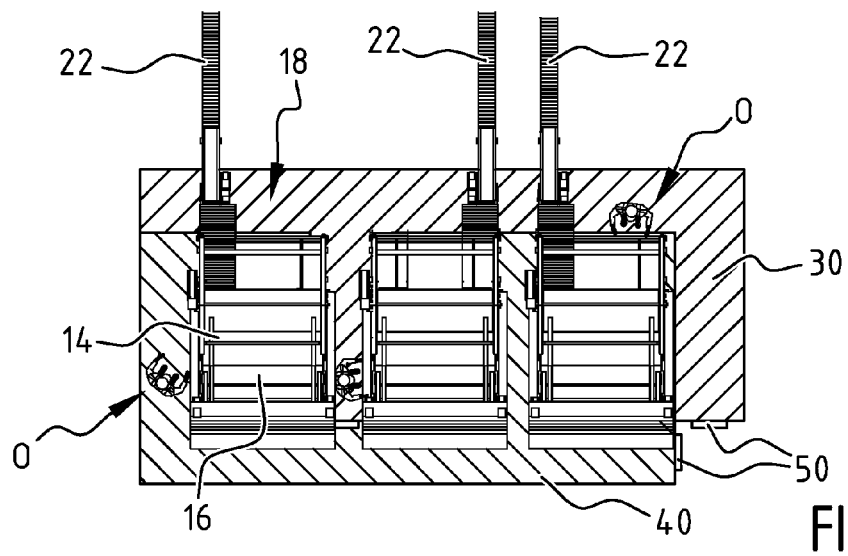
FIG. 4 is a top view of the setup shown in FIGS. 1-3.
Figure 5:
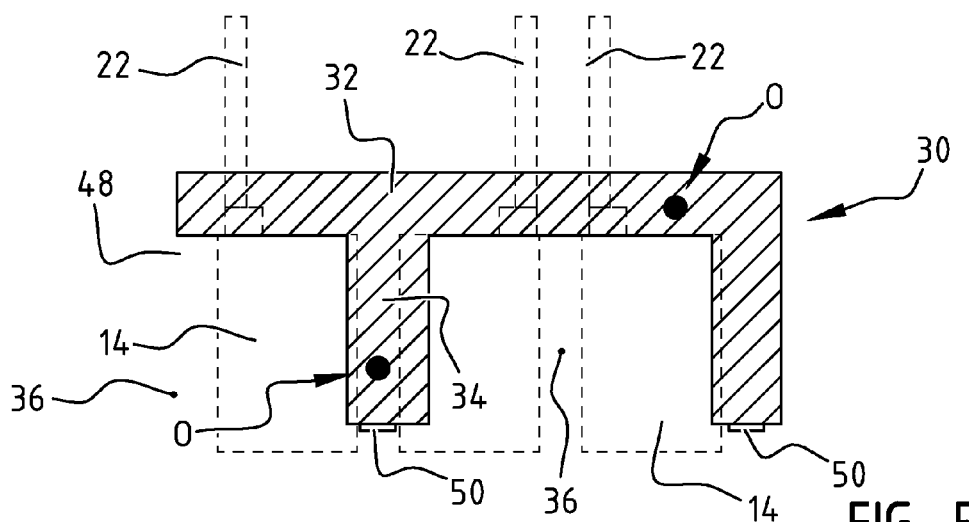
FIG. 5 is a top view as according to FIG. 4 in which the first support surface is shown schematically.
Figure 6:
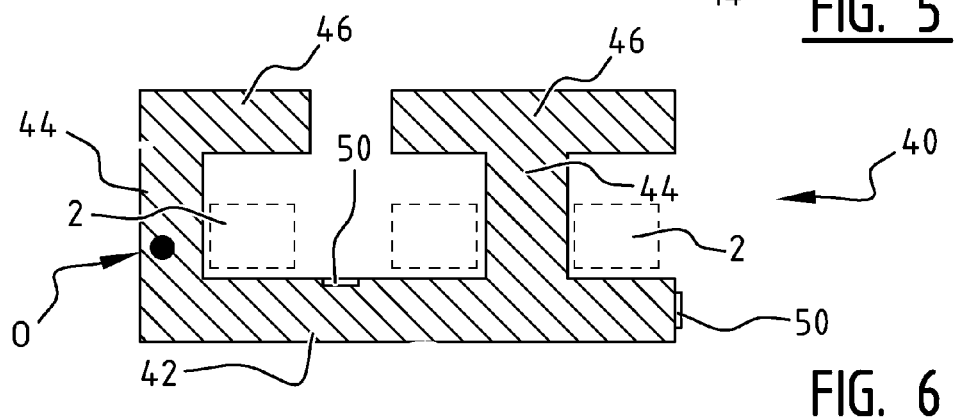
FIG. 6 is a top view as according to FIG. 4 in which the second support surface is shown schematically.

FIG. 4 is a top view of the setup shown in FIGS. 1-3, and FIGS. 5 and 6 show a schematic representation of the first support surface 30 (FIG. 5) and second support surface 40 (FIG. 6), wherein the contours of palletizing device 14, feed conveyor 22 and pallet lift 2 are shown in broken lines. As shown in FIG. 5, the upper first support surface 30 comprises a longitudinal part 32 and two transverse parts 34 arranged transversely of this longitudinal part 32. First support surface 30 is hereby adjacent to at least two sides of palletizing device 14, whereby this latter is readily accessible to the operator O. Provided on first support surface 30 is a stairway 50 with which this surface is accessible to an operator O from the ground.

Second support surface 40 likewise comprises a longitudinal part 42 and, in the shown embodiment, two transverse parts 44. Lift 2 with a pallet 54 optionally supported thereby is hereby also accessible from at least two sides by operator O in similar manner as just described.

In the shown embodiment a further longitudinal part 46 is also provided whereby pallet lift 2 itself is also accessible from the rear, i.e. a total of three sides are accessible.

Figure 7:
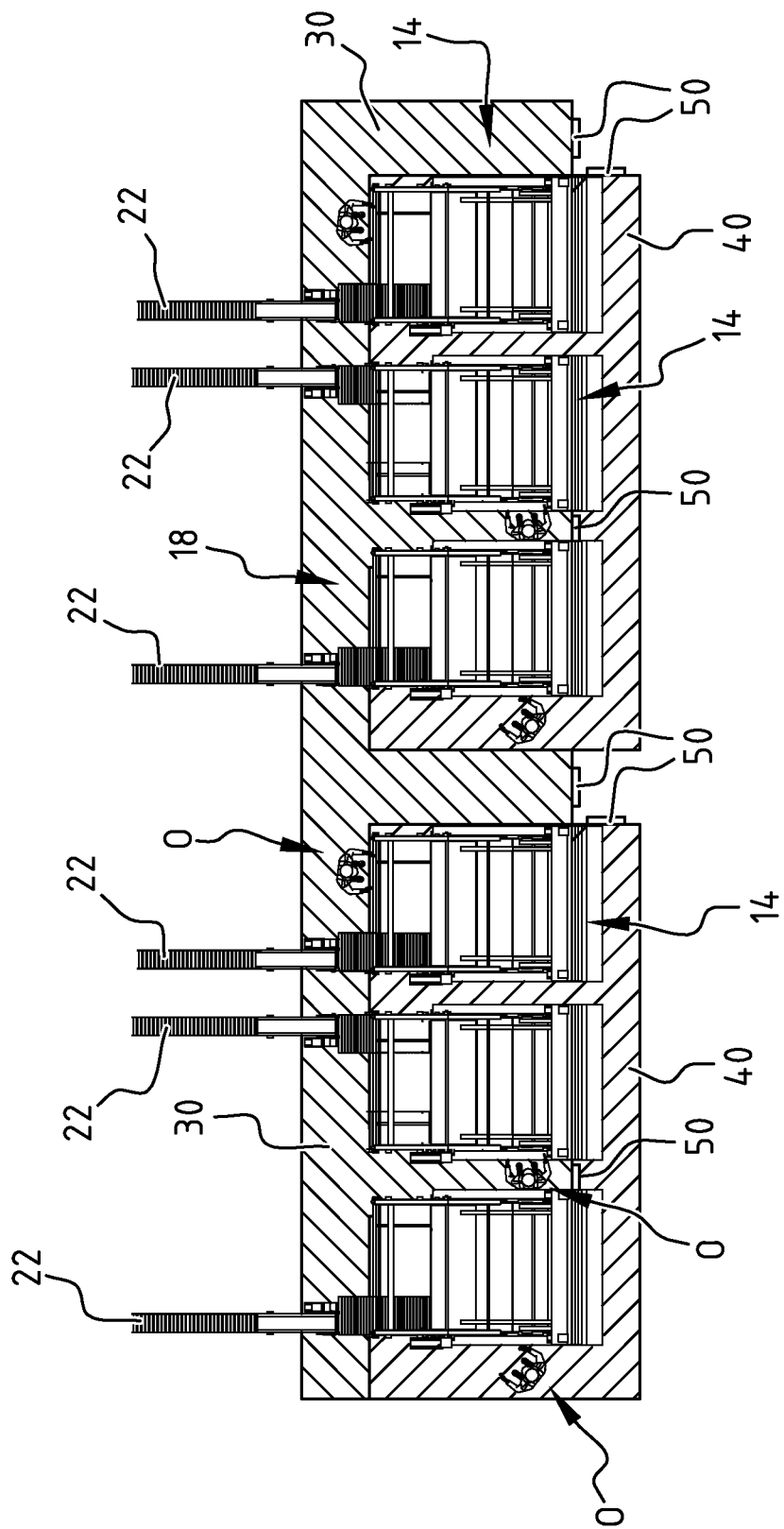
FIG. 7 is a top view of six pallet lifts with associated palletizing devices with support surfaces according to the invention.

As shown in FIG. 7, it is particularly advantageous for a transverse part 34 of first support surface 30 and a transverse part 44 of second support surface 40 to be provided with a large surface such that they make two adjacently disposed pallet lifts 2 and/or palletizing devices 14 accessible from these parts 34, 44.

Although it shows a preferred embodiment of the invention, the above described embodiment is intended solely to illustrate the present invention and not to limit in any way the specification of the invention. Where measures in the claims are followed by reference numerals, such reference numerals serve only to contribute toward the understanding of the claims, but are in no way limitative for the scope of protection. The rights described are defined by the following claims, within the scope of which many modifications can be envisaged.

What is claimed is:

1. An assembly, comprising:
   a pallet lift with which a pallet is displaceable in height direction;
   a palletizing device which is arranged close to the upper side of the pallet lift and with which objects are arrangeable on a pallet supported by the pallet lift;
   a first support surface arranged at a first distance under the palletizing device such that at least a part of the upper side of the palletizing device is accessible to an operator standing on the first support surface; and
   wherein the first support surface comprises at least one longitudinal part;
   a second support surface arranged at a second distance lower than the first support surface such that at least a part of the underside of the palletizing device is accessible to an operator standing on the second support surface;
   wherein the first support surface further comprises at least one transverse part arranged transversely of the longitudinal part, wherein the first support surface is adjacent to at least two sides of the palletizing device and makes this latter accessible to the operator;
   wherein the second support surface comprises at least one longitudinal part and at least one transverse part arranged transversely of the longitudinal part, wherein the second support surface is adjacent to the pallet lift on at least two sides and makes a pallet present on the pallet lift accessible to the operator;
   wherein the at least one transverse part of the first support surface and the at least one transverse part of the second support surface are arranged vertically offset relative to each other, and wherein the first support surface is provided with at least one recess above the at least one transverse part of the second support surface, with the at least one transverse part of the second support surface horizontally offset from the longitudinal part of the first support surface; and
   wherein the second distance at which the second support surface is arranged under the first support surface is a maximum of 1.5 m.

2. The assembly as claimed in claim 1, wherein the palletizing device comprises a forming surface for forming objects thereon, and wherein the first distance at which the first support surface is arranged under the forming surface is substantially 0.5-1.1 m.

3. The assembly as claimed in claim 2, wherein the palletizing device comprises a forming surface for forming objects thereon, and wherein the first distance at which the first support surface is arranged under the forming surface is substantially 0.6-1.0 m.

4. The assembly as claimed in claim 3, wherein the palletizing device comprises a forming surface for forming objects thereon, and wherein the first distance at which the first support surface is arranged under the forming surface is substantially 0.7-0.9 m.

5. The assembly as claimed in claim 1, wherein the second distance at which the second support surface is arranged under the first support surface is a maximum of 1.4 m.

6. The assembly as claimed in claim 1, wherein the second support surface is provided with one or more further longitudinal parts and at least partially encloses the pallet lift on at least three sides.

7. The assembly as claimed in claim 6, wherein at least one transverse part of the first support surface or at least one transverse part of the second support surface comprise a surface area such that two adjacently disposed pallet lifts and/or palletizing devices are accessible therefrom.

8. The assembly as claimed in claim 1, wherein at least a longitudinal part is provided on the feed side of the palletizing device where the objects are supplied to the palletizing device.

9. The assembly as claimed in claim 8, wherein one or more stairways or ladders are provided between the first support surface and the second support surface.

10. The assembly as claimed in claim 1, wherein one or more stairways or ladders are provided between the first support surface and the second support surface.

11. The assembly as claimed in claim 10, wherein at least one transverse part of the first support surface or at least one transverse part of the second support surface comprise a surface area such that two adjacently disposed pallet lifts and/or palletizing devices are accessible therefrom.

12. The assembly as claimed in claim 1, wherein at least one transverse part of the first support surface or at least one transverse part of the second support surface comprise a surface area such that two adjacently disposed pallet lifts and/or palletizing devices are accessible therefrom.

13. The assembly as claimed in claim 1, wherein the second distance at which the second support surface is arranged under the first support surface is a maximum of 1.3 m.

14. The assembly as claimed in claim 1, wherein the transverse parts of the first support surface and the second support surface are arranged offset relative to each other, and wherein the first support surface is provided with recesses above the transverse parts of the second support surface.

15. The assembly as claimed in claim 1, wherein at least a longitudinal part is provided on the feed side of the palletizing device where the objects are supplied to the palletizing device.

* * * * *